United States Patent Office 3,181,472
Patented May 4, 1965

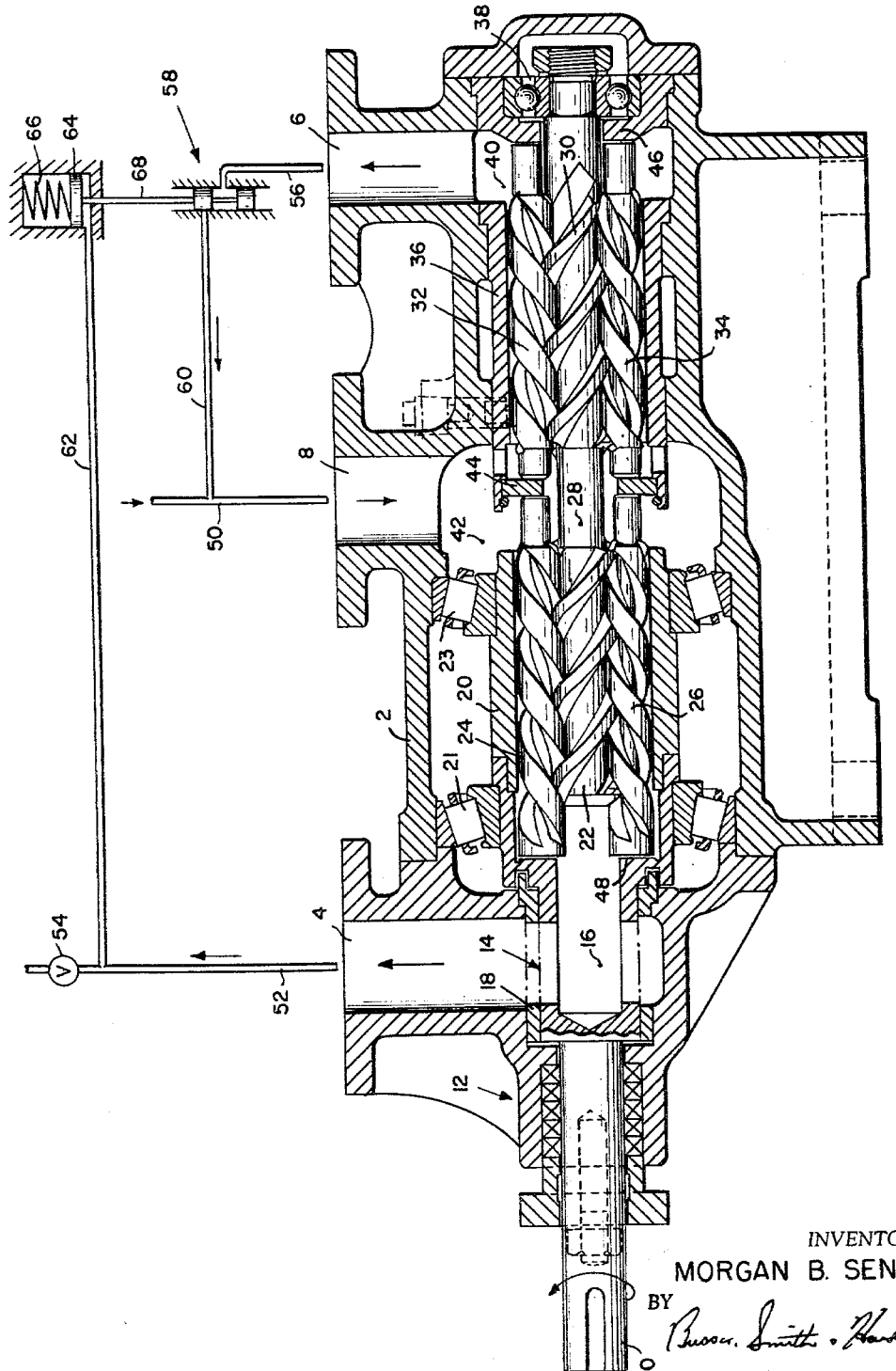

3,181,472
PUMPS OR MOTORS
Morgan B. Sennet, Erwinna, Pa., assignor to De Laval Turbine Inc., Trenton, N.J., a corporation of Delaware
Filed July 10, 1963, Ser. No. 293,984
7 Claims. (Cl. 103—120)

This invention relates to pumps or motors and has particular reference to pumps of variable delivery driven by constant speed motors or motors of variable speed driven by constant liquid supply flow.

The invention is particularly concerned with pumps and motors of the multiple screw type such as described in Montelius Patents 1,698,802, 1,821,523 and 1,965,557, dated, respectively, January 15, 1929, September 1, 1931, and July 3, 1934, and in my Patents 2,693,762 and 2,693,763, both dated November 9, 1954. The Montelius patents referred to relate to positive multiple screw pumps while my patents relate to non-positive multiple screw pumps of the same general type. In the positive screw pump substantially completely closed chambers advance along the screw assembly from the inlet to the outlet. Deviations from completely positive action are only those which arise from leakage through running clearances and from expedients sometimes adopted to minimize pulsation noise in operation. From the standpoint of effective operation they may be regarded as true positive pumps having delivery rates strictly proportional to shaft speed.

In the non-positive pumps of the types described in my patents above mentioned, closed chambers are not provided, but a leakage path may be traced between outlet and inlet providing slip in the flow. By virtue of dynamic action tied up with quite indirect slip passages as just mentioned the non-positive pumps are adapted to produce high pressures particularly when operated, as is usual, at high speeds. They are useful where some slippage is desired and the use of positive pumps might create hazardous conditions if flow were suddenly cut off, or where a gradual pressure rise is desired through the pump. In the case of motors, non-positive screw assemblies are also useful to avoid shocks by offering some degree of cushioning.

Since commercially practical electric motors of alternating current type operate either at fixed speed or nearly fixed speed, being, for example, of synchronous or induction type, the driving of pumps by such motors involves substantially constant flow displacement even in the case of non-positive pumps of the type described which, when operated efficiently produce displacements nearly proportional to speed. In many instances variable flow rates of considerable range of variations are desirable, and when that is the case resort must be had to by-passing flow in excess of that required. Diverting flow from the main pump is not desirable for various reasons involving complex control and large energy losses.

As has been indicated, pumps of the types referred to may also be used as motors by feeding them with flowing liquid supplied by a pump. If the liquid-supplying pump is of the multiple screw type mentioned above the supply of liquid is essentially constant if the speed of the pump is constant. Accordingly, due to the same type of consideration as above mentioned, the speed of the output shaft will be essentially constant. As will be evident from what will be described hereafter, the same aspect of invention applied to pumps will equally apply, with mere reversals of flow and transmission of power, to motors. In the former case variable liquid delivery is effected. In the latter, variable motor output speed. For the sake of simplicity in description, the invention will be primarily described as applied to variable delivery pumps, and it will be obvious to those skilled in the art that reversal of the matters described will result in variable speed motors.

In the usual multiple screw pump a stationary casing is provided with a plurality of parallel intersecting bores housing the intermeshing screws. A power screw is driven and with it there rotate one or more idlers. The nature of operation is such that pumping could equally well be effected if the casing of the type described were rotated and the power screw held stationary, in which case the idlers would have a planetary movement about the power screw. Continuing the same line of thinking, it is evident that the volumetric displacement rate of the pumped liquid is dependent upon the relative rotational speed of the power screw and casing. In the limit, if there is no relative rotation but both are rotating at the same speed, no volumetric displacement will occur. It will thus be seen that if one of the elements, the casing or the power screw, is rotated at constant speed in one direction, the volumetric displacement may be controlled by control of speed of the other of these elements.

This expedient has been proposed in application to hydraulic engines and is exemplified in Montelius Patent 2,171,146, dated August 29, 1939. In that patent there is disclosed the control of volumetric displacement by mechanical variable braking of a power screw and casing of a multiple screw pump. Such mechanical braking involves frictional wear and heat dissipation difficulties along with associated mechanically complex devices such as a planetary gear train with the attendant necessity for providing multiple bearings and other parts.

It is the general object of the present invention to provide an arrangement involving great simplicity of construction with simple, reliable and smoothly operating controls. In particular, control is effected merely by variably throttling liquid flow in a circuit other than that involved in the main pumping operation. Concentric mountings are invloved also making for simplicity of construction.

Briefly stated, two pumps are provided which may be of the same or similar form. One of these is the main pump involving both a rotatable power screw and a rotatable casing. The second pump controls the rotation of one of these elements of the main pump, the other of which is power driven. Flow is controlled in the circuit of the auxiliary pump.

Further objects of the invention, particularly relating to details of construction and operation will become apparent from the following description, read in conjunction with the accompanying drawing in which the figure illustrates in axial section a preferred form of pump assembly provided in accordance with the invention together with a diagrammatic illustration of the control connections involved.

A stationary housing 2 encloses the operating elements and is provided with a pair of outlet ports 4 and 6 and an inlet port 8, all arranged for connection in conventional fashion to suitable piping as will be discussed hereafter. Drive is effected through a shaft 10 which it may be assumed is driven by a substantially constant speed motor. Of course, a variable speed motor may be used, but if the range of speed is, as usual, limited, the invention is applicable to increase greatly the range of delivery. The shaft passes through a stuffing box 12 and within the housing has a connection 14 provided with openings through which flow may take place from a chamber 16 in an enlarged interior extension of the shaft to the port 4. A bearing is indicated at 18. The shaft extension is fixedly connected to the casing 20 of the main pump which is of the multiple screw type described in the first mentioned Motelius patents. As illustrated, the pump is of positive type and the casing is provided with three axial intersecting bores receiving the power screw 22 and a pair of idlers 24 and 26, each being provided with two threads. As is well known, this arrangement provides a positive pump when the threads are mutually generated. The details of such pumps are well-known and need not be here described. Annular bearings indicated at 21 and 23 mount the casing 20 for rotation within the housing 2 and are desirably provided with conical rollers to take up end thrust.

The power screw 22 is connected through a shaft extension 28 to the power screw 30 of a similar multiple screw pump. This, in fact, may be identical with the pump just described and has idlers 32 and 34, all three screws being mounted in the intersecting axial bores of a casing 36 which is fixed in the housing 2. The integral arrangement of the two power screws is advantageous in that very accurate alignment may be secured, and in fact the two screws may be formed and ground as a single unit. Operation may be considered to be carried out at very high shaft speeds and highly accurate screw forms and associated parts are essential for proper operation. A bearing 38 serves as an outboard mounting for the power screws, their inner portions being held in alignment by the bores of their respective casings. The arrangement, as will be evident, provides a chamber 40 communicating with the port 6 and with the right-hand end of the screw assembly comprising the screws 30, 32 and 34. Between the screw assemblies and communicating with both there is the chamber 42 communicating with the port 8. A ring 44 which does not cut off this communication provides a thrust bearing for the idlers of both pumps. Motion limiting surfaces are provided for the idlers at 46 and 48. Under normal conditions of operation of the pump the idlers are forced by pressure into engagement with the ring 44.

Reference may now be made to the piping and control connections. Pumps of the type described are usually used for the pumping of oil or similar lubricating liquids, and hence oil will be referred to as the liquid involved. This is supplied to the pump through the connection 50 which may communicate with a supply sump or some other source of the oil. Inflow takes place through the port 8 into the chamber 42 whence flow may take place through the two pumps. The delivery of oil which is to be externally utilized is through pipe 52 from the port 4. There is indicated in this pipe a valve 54 which is merely indicative of some general load against which pumping is effected. An actual valve of adjustable type may be used in some cases to control flow of the delivered oil; in other cases the delivery may be to bearings, to elevated storage tanks, to hydraulic motors for driving the same, or to other utilization devices.

Oil under certain conditions is delivered from the port 6 to the pipe 56 which is illustrated as supplying it to a conventionalized flow-throttling valve 58 which may, of course, take any of the many forms known in the art. Flow from this valve takes place through connection 60 which may return to any point of the oil supply but is illustrated as connected to the inlet pipe 50. Recirculation is generally involved. The movable element of the valve 58 is controlled by a rod 68 connected to a piston 64 spring loaded as indicated at 66 and slidable in a suitable cylinder. The cylinder space below the piston has communication through pipe 62 with the delivery pipe 52.

While the control valve 58 is illustrated as automatically responsive to pressure in the delivery line 52, it will become evident that this valve may be controlled automatically or manually adjusted in numerous fashions. However, for purposes of description of operation, the arrangement specifically illustrated will be considered.

The operation is as follows:

Assume, first, that the valve 58 is closed so that no flow may occur through port 6. Under this condition it will be evident that the right hand control pump is blocked, since, being positive, its screws cannot rotate without liquid displacement and this is prevented by the closed valve. Since screw 30 is thus locked, screw 22 must be stationary. Casing 20 is motor driven in the direction of the arrow applied to shaft 10, and being thus driven, positive flow is provided from the inlet chamber 42 to the chamber 16 and out through the port 4 and pipe connection 52. Assuming a positive pump involving the casing 20 and one or more closures by the screws, a definite volumetric liquid displacement is produced per revolution of the shaft 10. Operation then involves maximum liquid displacement.

Assume, next, the other limit of operation in which the valve 58 is fully open to provide quite free flow of liquid through the pipe 56 for recirculation back to the supply through connection 60. Under these conditions the screws of the right hand assembly are quite free to rotate with the rate of rotation and the volume flowing through this pump related by its geometrical displacement characteristics. Assuming that the shaft 10 is driven at the same speed as before, the screw 22 is now completely free to yield to even a small pressure gradient across it, and even a slight increase of pressure in chamber 16 over that existing in chamber 42 will serve to drive the screw 22 in the same direction as the pump casing 20. Because it will be driven so that no pressure gradient can exist as just mentioned, it will be driven at the same speed as this casing with the result that the main pump is completely inoperative in producing any displacement. It may be here noted that in pumps of this type handling lubricating liquids and conforming to commercially acceptable requirements of accuracy frictional forces are quite low so that they do not enter the picture in the way of providing any drag on essentially free movement of the screw 22. The right hand auxiliary pump, accordingly, acts as an ordinary pump with rotating power screw and stationary casing, and accordingly produces displacement geometrically related to the motion of the shaft 10. To the extent that the flow is essentially free for the liquid pumped by this right-hand pump, the screw 30 is essentially unimpeded in its movement. The result is that for any appreciable head in the chamber 16 the flow delivered by the main pump is essentially zero.

Next, it may be assumed that the valve 58 is in an intermediate position throttling the flow so that some substantial gradient exists between the outlet and inlet of the auxiliary pump. The pressure gradient which exists is dependent upon the volumetric displacement of this pump, and the power screw 30 will rotate at a controlled speed depending upon the throttling action, the power screw 22 rotating at the same speed. Under the flow control conditions, the rotation of screw 22 will be at a rate less than that of the casing 20, and consequently a net pumping action will take place in proportion to the relative speeds of these two elements. If the valve 58 were manually adjusted, volumetric control would thus be effected, though not automatically. One form of automatic operation, however, may be provided, in accordance with what is shown. Assume valve 54, or the equivalent utilization device, provides a flow-throttling action. If the flow delivery through pipe 52 tends to increase, the pressure in connection 62 would increase, moving the piston 64 upwardly against the action of spring 66 and thus moving the valve element at 58 upwardly to decrease the throttling action on the flow through pipe 56. The freer flow thus provided would permit a greater displacement rate in the right-hand pump corresponding to increased rotational speed of screws 30 and 22 in the direction of rotation of the shaft 10. This, lessening the relative speed of the casing 20 with respect to screw 22, will decrease the volumetric displacement of the main pump. A feedback restoring action is thus effected so that for any particular setting of the load represented, as stated, by adjustment of valve 54, there will be a particular volumetric delivery.

In summary, therefore, the arrangement illustrated and described provides a variable delivery pump which, as will be evident, is of quite simple construction and readily and smoothly controlled either automatically or manually.

While the construction described is preferred, it will be evident that various interchanges of parts and operations may effect substantially the same operating results. For example, the shaft 10 might well be connected to rotate the screw 22 of the primary pump in which case this screw would not be connected with the screw 30 of the auxiliary control pump, but the latter screw could be connected to rotate with the casing 20. Or, as still another alternative, with this same type of arrangement with respect to the main pump, the two housings 20 and 36 could be arranged to rotate together, the screw 30 being held stationary. Various other interchanges of the pump elements and their connections may be provided. It will, of course, be understood that the hands of the screws will be chosen for proper directions of displacement with respect to the relative rotations involved.

Further, the screw arrangements may be of the type shown in my prior patents referred to above to provide non-positive rather than positive pumps. Equally well, one of the pumps may be positive and the other non-positive. Such arrangements involving non-positive pumps have special utility in cases where possibility of complete stoppage of flow might occur while driving power is applied.

The application of the invention to motors will now be quite obvious without elaboration. If driving liquid is supplied at a constant or variable rate, as through the port 4, locking of the auxiliary pump would produce a speed of rotation of the shaft 10, now the output shaft, in correspondence with the volume of liquid supply. However, if operation of the right-hand pump is permitted by virtue of flow variably controlled by the valve 50, the speed of rotation of the output shaft would be correspondingly reduced and controlled.

In the case of the particular structure disclosed in the drawing, the left-hand pump constitutes a first liquid displacement device which is of the type comprising a casing 20 having a plurality of bores mounting a set of intermeshing screws 22, 24 and 26 and in which device liquid displacement therethrough is interdependent with relative coaxial rotation between one of its screws, 22, as a first element and its casing 20 as a second element. The second liquid displacement device operating as a pump is the right-hand pump which is also of a type comprising a case 36 having a plurality of bores mounting a set of intermeshing screws 30, 32 and 34, and in which second device liquid displacement therethrough is interdependent with relative coaxial rotation between one of its screws 30 as a third element and its casing 36 as a fourth element. The means restraining one of said elements, 36, of the second device against rotation is the housing in which the casing 36 is secured. The means connecting the other element 30 of the second device to one of the elements 22 of the first device for rotation therewith is the connecting shaft 28. The means providing inflow and outflow liquid passages for the first device are the structures providing the passages 8 and 4, while the means providing inflow and outflow liquid passages for the second device are the structures providing the passages 8 and 6. The means external to the second device for variably controlling liquid pumped thereby is provided by the valve 58. The means effecting flow of liquid through the first device is the shaft 10. This shaft is connected to and drives the element 20 of the first device which is not connected to the rotating element 30 of the second device. It will be noted that the first and third elements referred to above are connected together, these elements being the screws 22 and 30. These screws are coaxial. It will also be evident that all of the first, second, third and fourth elements are coaxial. Means for variably controlling liquid pumped by the second device is constituted by the piston and cylinder arrangement at 64 and the valve 58 and is responsive, through connection 62 to the pressure of outflow in connection 52 pumped by the first device.

In the event that the arrangement shown is used as a motor, the means effecting flow of liquid through the first device is a pump supplying liquid under pressure through connection 52, the first device functioning as a motor, the shaft 10 connected to the element 20 of the first device being then driven by this element which is not connected to the rotating element 30 of the second device.

It will be evident that various changes may be made in accordance with the invention without departing from the scope thereof as defined in the following claims.

What is claimed is:

1. In combination, a first liquid displacement device of the type comprising a rotatable casing having a plurality of bores mounting a set of intermeshing screws and in which device axial liquid displacement therethrough is interdependent with relative coaxial rotation between one of its screws as a first element and its casing as a second element, both of said elements being rotatable, a second liquid displacement device operating as a pump and of a type comprising a casing having a plurality of bores mounting a set of intermeshing screws and in which second device axial liquid displacement therethrough is interdependent with relative coaxial rotation between one of its screws as a third element and its casing as a fourth element, means restraining one of said elements of the second device against rotation, means connecting the other element of the second device to one of said rotatable elements of the first device for rotation therewith, means providing inflow and outflow liquid passages for each of said devices at the respective ends of its screws, means external to said second device for variably controlling liquid pumped thereby, and means effecting flow of liquid through said first device.

2. The combination according to claim 1 in which the last means is constituted by a shaft connected to and driving the element of the first device which is not connected to the rotating element of the second device.

3. The combination according to claim 1 in which the last means is constituted by means delivering liquid under pressure to said first device and in which a shaft is connected to and driven by the element of the first device which is not connected to the rotating element of the second device.

4. The combination according to claim 1 in which the elements of the two devices which are connected together are said first and third elements.

5. The combination of claim 4 in which the screws constituting said first and third elements are coaxial.

6. The combination according to claim 1 in which all of said elements are coaxial.

7. The combination according to claim 1 in which the first device is a pump, and in which said means for variably controlling liquid pumped by said second device is responsive to the pressure of outflow pumped by said first device.

References Cited by the Examiner

UNITED STATES PATENTS

| 2,171,146 | 8/39 | Montelius | 74—687 |
|---|---|---|---|
| 2,276,794 | 3/42 | Ricci | 103—35 |
| 2,358,815 | 9/44 | Lysholm | 230—143 |
| 2,381,695 | 8/45 | Sennet | 103—128 |
| 2,390,487 | 12/45 | Lawrence et al. | 230—11 |
| 2,397,139 | 3/46 | Heaton | 103—121 |
| 2,403,332 | 7/46 | Bevins | 230—11 |
| 2,645,901 | 7/53 | Elkins | 103—128 |
| 2,645,903 | 7/53 | Elkins | 103—128 |

JOSEPH H. BRANSON, Jr., Primary Examiner.

WILBUR J. GOODLIN, Examiner.